US012676298B2

(12) United States Patent
Kim et al.

(10) Patent No.: US 12,676,298 B2
(45) Date of Patent: Jul. 7, 2026

(54) NEGATIVE ELECTRODE FOR SECONDARY BATTERY

(71) Applicant: LG ENERGY SOLUTION, LTD., Seoul (KR)

(72) Inventors: Young Jae Kim, Daejeon (KR); Je Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/346,595

(22) Filed: Jul. 3, 2023

(65) Prior Publication Data

US 2023/0352652 A1 Nov. 2, 2023

Related U.S. Application Data

(62) Division of application No. 16/480,182, filed as application No. PCT/KR2017/015556 on Dec. 27, 2017, now Pat. No. 11,735,713.

(30) Foreign Application Priority Data

Apr. 6, 2017 (KR) ........................ 10-2017-0044840

(51) Int. Cl.
| | |
|---|---|
| *H01M 4/133* | (2010.01) |
| *H01M 4/02* | (2006.01) |

(Continued)

(52) U.S. Cl.
CPC ......... *H01M 4/133* (2013.01); *H01M 4/0404* (2013.01); *H01M 4/134* (2013.01);

(Continued)

(58) Field of Classification Search
CPC .............................. H01M 4/622; H01M 4/134
See application file for complete search history.

(56) References Cited

U.S. PATENT DOCUMENTS

| | | | |
|---|---|---|---|
| 2003/0157407 A1* | 8/2003 | Kosuzu ................... | H01M 4/62 429/231.95 |
| 2005/0266150 A1 | 12/2005 | Yong et al. | |

(Continued)

FOREIGN PATENT DOCUMENTS

| | | |
|---|---|---|
| CN | 104795559 A | 7/2015 |
| CN | 104810506 A | 7/2015 |

(Continued)

OTHER PUBLICATIONS

Chaplin, Martin; "Carboxymethylcellulose (CMC)", <https://water.lsbu.ac.uk/water/carboxymethylcellulose.html> (Year: 2002).*

(Continued)

*Primary Examiner* — Jessie Walls-Murray
(74) *Attorney, Agent, or Firm* — Birch, Stewart, Kolasch & Birch, LLP

(57) ABSTRACT

A negative electrode for a secondary battery, and more particularly, to a negative electrode for a secondary battery used for a negative electrode of a secondary battery. A negative electrode for a secondary battery may include a carbon-based active material; a conductive material; a silicon-based active material-polymer binder combination including a silicon-based active material, and a polymer binder bonded to a surface of the silicon-based active material, wherein the polymer binder suppresses expansion of the silicon-based active material; and a water-based binder.

15 Claims, 5 Drawing Sheets

Composition ratio = silicon-based material/ conductive material/ polymer binder

(51) Int. Cl.

| | |
|---|---|
| *H01M 4/04* | (2006.01) |
| *H01M 4/134* | (2010.01) |
| *H01M 4/139* | (2010.01) |
| *H01M 4/1393* | (2010.01) |
| *H01M 4/1395* | (2010.01) |
| *H01M 4/36* | (2006.01) |
| *H01M 4/38* | (2006.01) |
| *H01M 4/587* | (2010.01) |
| *H01M 4/62* | (2006.01) |
| *H01M 10/0525* | (2010.01) |

(52) U.S. Cl.
CPC ......... *H01M 4/139* (2013.01); *H01M 4/1393* (2013.01); *H01M 4/1395* (2013.01); *H01M 4/364* (2013.01); *H01M 4/386* (2013.01); *H01M 4/587* (2013.01); *H01M 4/622* (2013.01); *H01M 4/625* (2013.01); *H01M 4/628* (2013.01); *H01M 10/0525* (2013.01); *H01M 2004/027* (2013.01)

(56) References Cited

U.S. PATENT DOCUMENTS

| | | | | |
|---|---|---|---|---|
| 2009/0004566 A1* | 1/2009 | Shirane | ................. | H01M 4/485 |
| | | | | 429/220 |
| 2010/0047693 A1* | 2/2010 | Yang | .................... | H01M 4/621 |
| | | | | 528/65 |
| 2011/0027636 A1* | 2/2011 | Lee | ................... | H01M 10/0431 |
| | | | | 429/94 |
| 2012/0009480 A1 | 1/2012 | Ohashi et al. | | |
| 2012/0088155 A1* | 4/2012 | Yushin | ................. | H01M 4/622 |
| | | | | 977/773 |
| 2012/0183848 A1 | 7/2012 | Kang et al. | | |
| 2013/0130112 A1 | 5/2013 | Chung et al. | | |
| 2013/0202781 A1 | 8/2013 | Kobayashi | | |
| 2014/0050975 A1 | 2/2014 | Cha et al. | | |
| 2014/0050981 A1* | 2/2014 | Kang | ................... | H01M 4/623 |
| | | | | 429/211 |
| 2014/0170484 A1 | 6/2014 | Fukahori | | |
| 2014/0242481 A1 | 8/2014 | Hwang et al. | | |
| 2014/0255777 A1* | 9/2014 | Jeong | ................... | H01M 4/133 |
| | | | | 524/45 |
| 2015/0037672 A1 | 2/2015 | Yang et al. | | |
| 2015/0140423 A1* | 5/2015 | Brown | ................. | H01M 4/602 |
| | | | | 429/213 |
| 2015/0147627 A1* | 5/2015 | Takano | ............... | H01M 50/449 |
| | | | | 429/144 |
| 2015/0194663 A1* | 7/2015 | Youm | ............... | H01M 10/0567 |
| | | | | 429/200 |

| | | | | |
|---|---|---|---|---|
| 2016/0006024 A1 | 1/2016 | Xiao et al. | | |
| 2016/0308258 A1* | 10/2016 | Ogihara | .............. | H01M 10/446 |
| 2017/0092939 A1 | 3/2017 | Kim et al. | | |
| 2018/0108913 A1 | 4/2018 | Zhang et al. | | |
| 2018/0226637 A1* | 8/2018 | Koike | ................... | H01M 4/587 |
| 2019/0260011 A1* | 8/2019 | Ho | .................... | H01M 10/0525 |
| 2019/0326589 A1 | 10/2019 | Ho et al. | | |

FOREIGN PATENT DOCUMENTS

| | | | |
|---|---|---|---|
| CN | 105009331 A | 10/2015 |
| CN | 105304858 A | 2/2016 |
| CN | 106058259 A | 10/2016 |
| CN | 106410177 A | 2/2017 |
| EP | 3 057 157 A1 | 8/2016 |
| JP | 5754855 B2 | 7/2015 |
| JP | 2016-219370 A | 12/2016 |
| KR | 10-2009-0017939 A | 2/2009 |
| KR | 10-2012-0069314 A | 6/2012 |
| KR | 10-2014-0024586 A | 3/2014 |
| KR | 10-2014-0079702 A | 6/2014 |
| KR | 10-2014-0106292 A | 9/2014 |
| KR | 10-2014-0117947 A | 10/2014 |
| KR | 10-2015-0071452 A | 6/2015 |
| KR | 10-2016-0102407 A | 8/2016 |
| KR | 10-1656326 B1 | 9/2016 |
| KR | 10-2017-0036417 A | 4/2017 |
| WO | WO2006/009284 A1 | 1/2006 |
| WO | WO2013/005887 A1 | 1/2013 |
| WO | WO 2014/183379 A1 | 11/2014 |
| WO | WO 2015/118849 A1 | 3/2017 |
| WO | WO 2017/032154 A1 | 3/2017 |
| WO | WO 2016/152056 A1 | 1/2018 |

OTHER PUBLICATIONS

Mazouzi et al., "Critical roles of binders and formulation at multiscales of silicon-based composite electrodes", Journal of Power Sources vol. 280, Apr. 15, 2015, pp. 533-549, <https://doi.org/10.1016/j.jpowsour.2015.01.140> (Year: 2015).*

European Search Report for Application No. 17904502.6 dated Jan. 29, 2020.

International Search Report (PCT/ISA/237) issued in PCT/KR2017/015556, dated Apr. 6, 2018.

Park et al, "Hydrophillic polyvinyl alcohol coating on hydrophobic electrospun nanofiber membrane for high performance thin film composite forward osmosis membrane", Desalination, vol. 426, pp. 50-59, <https://doi.org/10.1016/j.desal.2017.10.042> (Year: 2018).

Zhao, "Research Progress of Si-Based Composite for Li-Ion Batteries", Gwangdong Chemical Industry, vol. 43, No. 10, pp. 97-98, May 30, 2016 with English Abstract.

* cited by examiner

[Fig. 1]
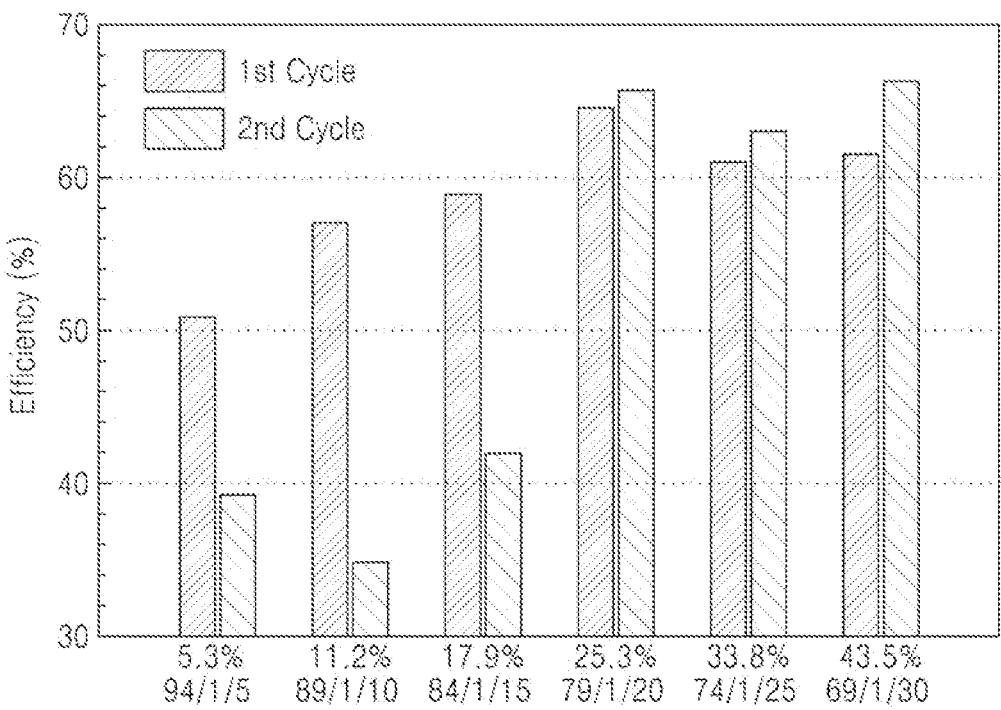
Composition ratio = silicon−based material/
conductive material/ polymer binder 【Fig. 2】
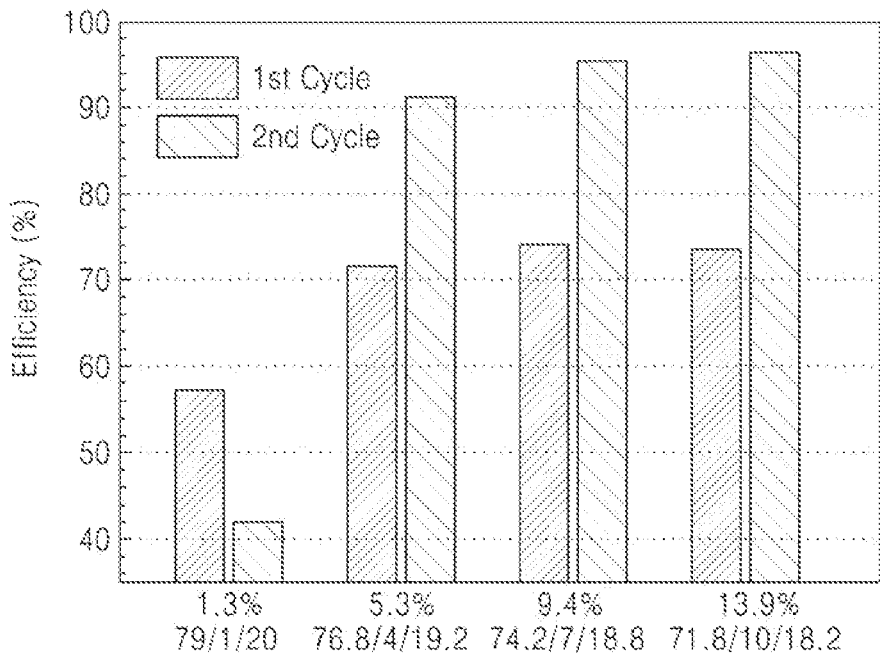
【Fig. 3】
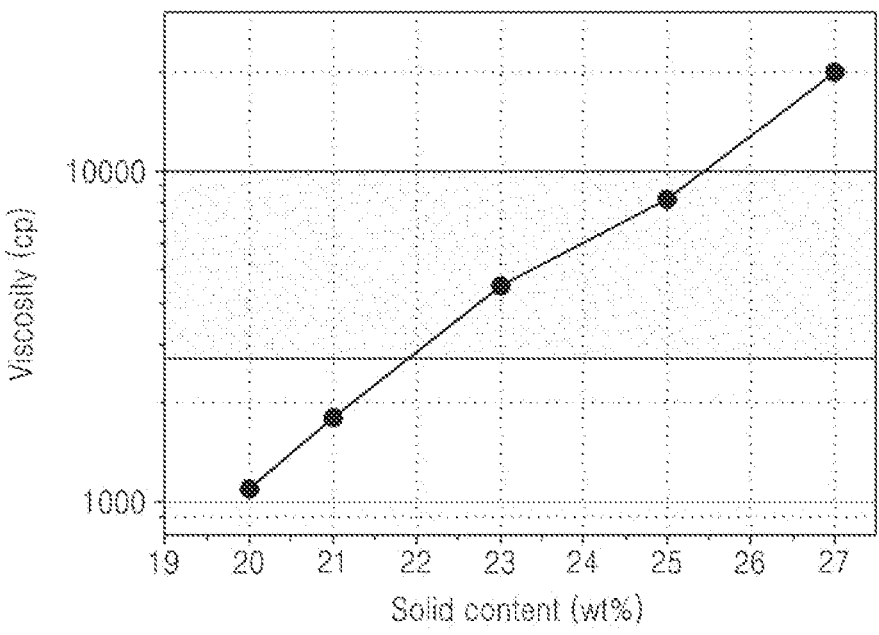

【Fig. 4】
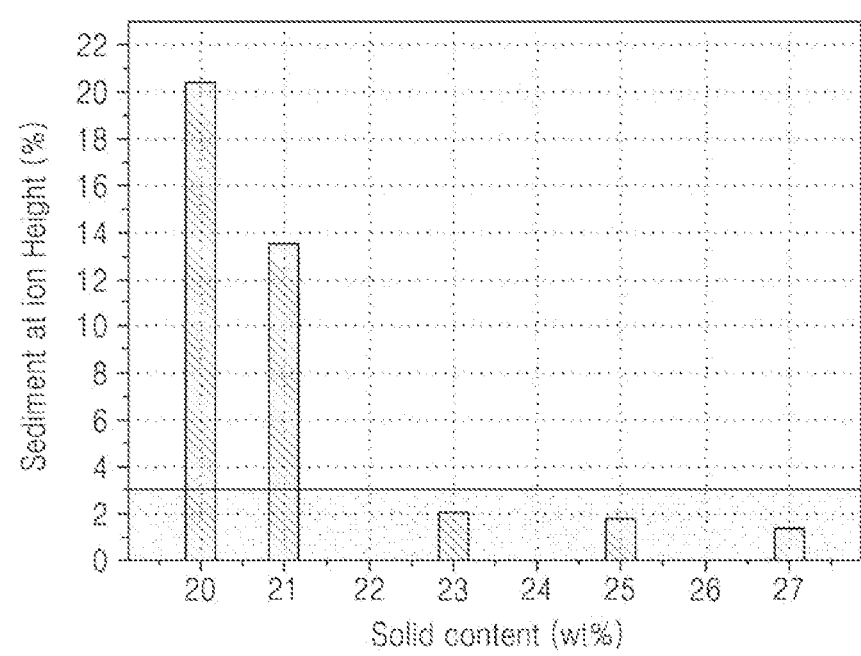
【Fig. 5】
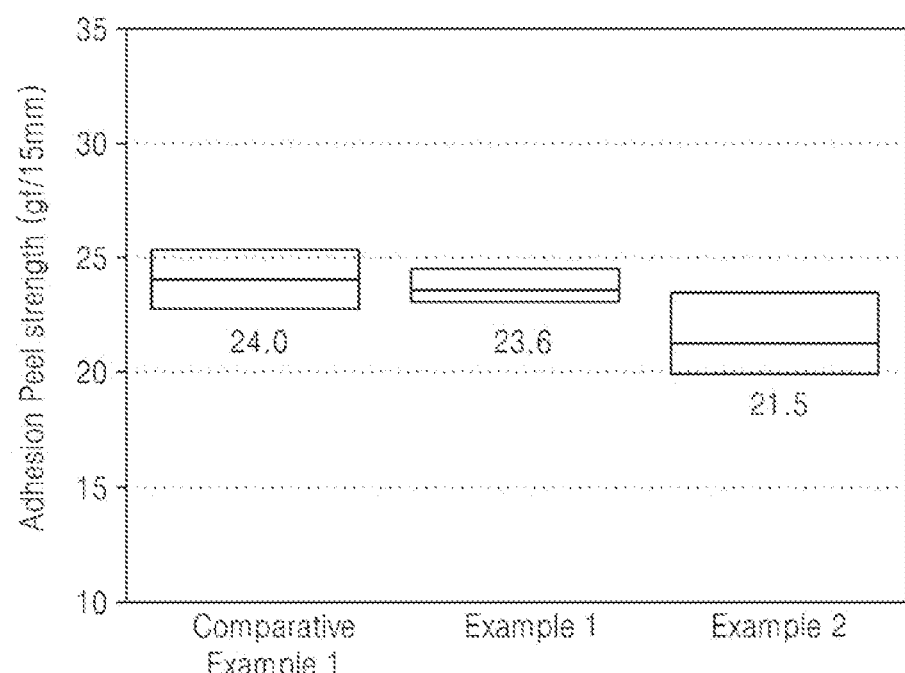

【Fig. 6】
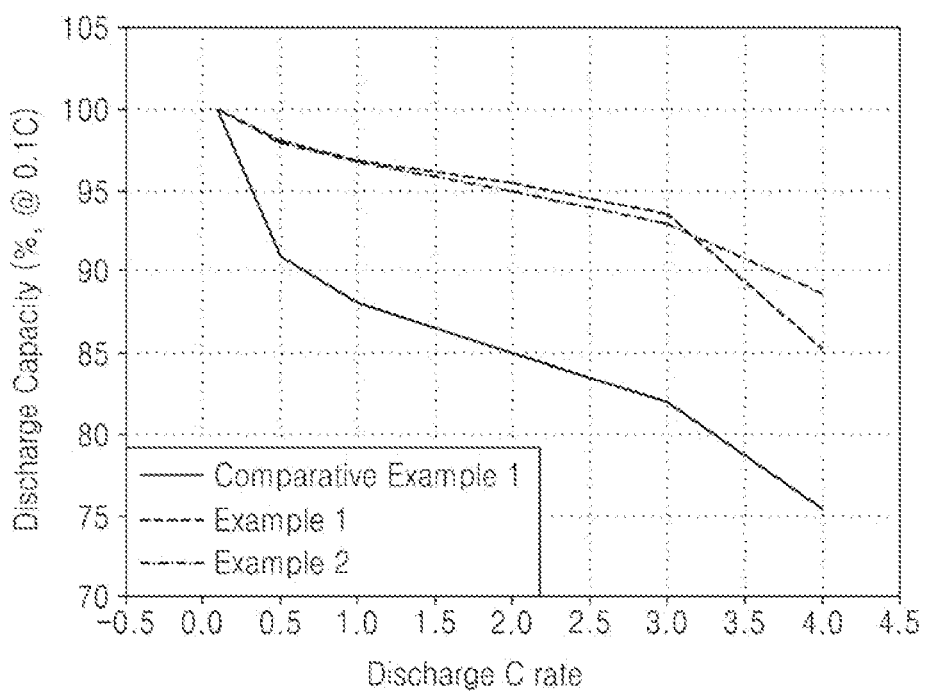
【Fig. 7】
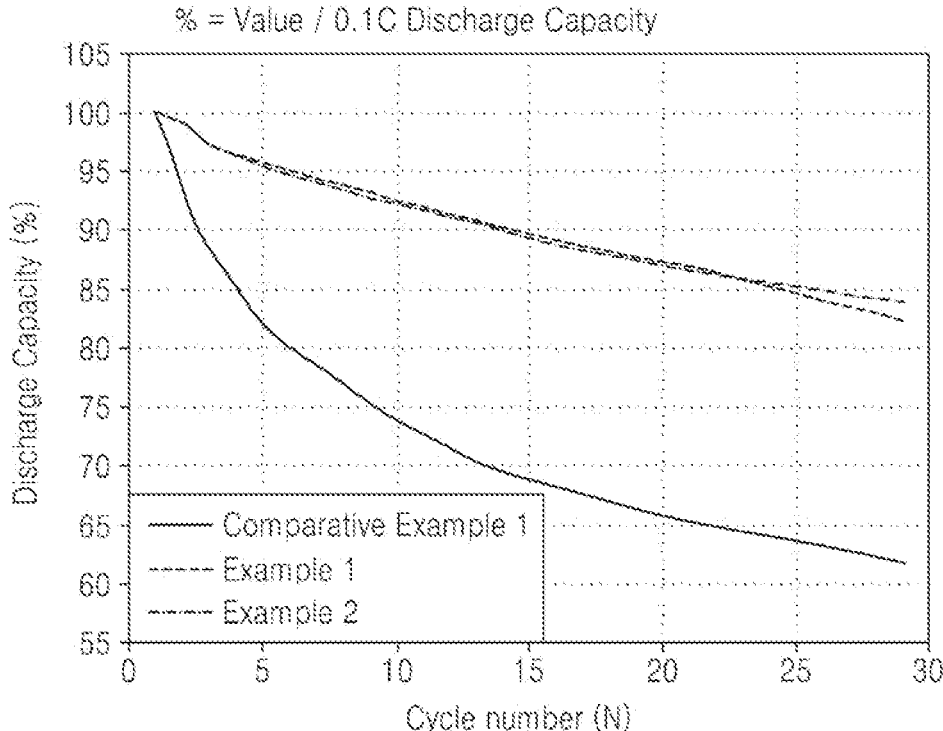

【Fig. 8】
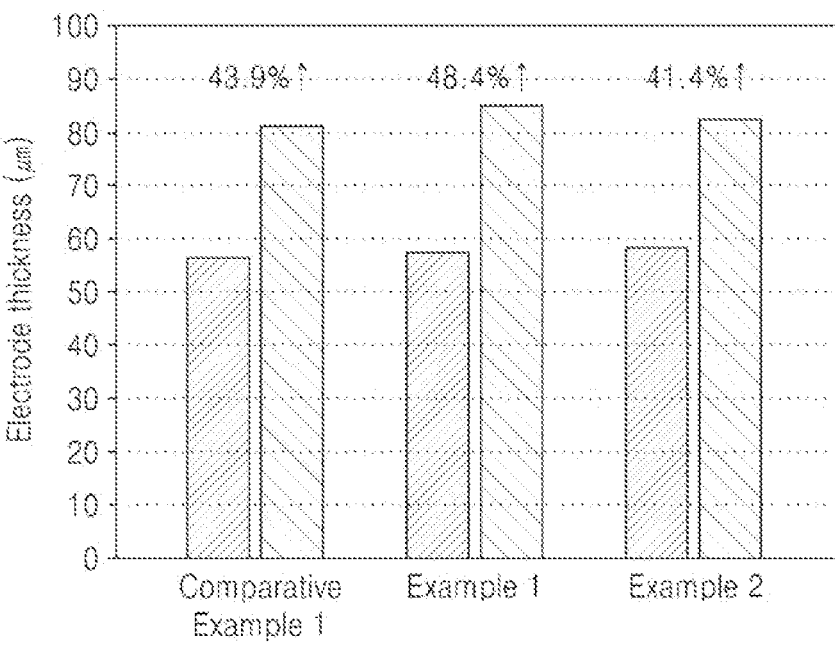

NEGATIVE ELECTRODE FOR SECONDARY BATTERY

CROSS-REFERENCE TO RELATED APPLICATIONS

This application is a Divisional of copending application Ser. No. 16/480,182 filed on Jul. 23, 2019, which is the U.S. National Phase of PCT/KR2017/015556, filed Dec. 27, 2017, and which claims priority under 35 U.S.C. § 119(a) to Application No. 10-2017-0044840 filed in Korea, on Apr. 6, 2017, the entire contents of all of which are expressly incorporated by reference into the present application.

TECHNICAL FIELD

The present disclosure relates to a negative electrode for a secondary battery, and more particularly, to a negative electrode for a secondary battery used for a negative electrode of a secondary battery.

BACKGROUND ART

Recently, interest in energy storage technology has increased. As the application fields are expanded to energy of mobile phones, camcorders, notebook PCs, and even to that of electric vehicles, efforts for research and development of electrochemical devices are more and more materialized. In this respect, electrochemical devices are receiving the most attention, and in particular, the development of a rechargeable secondary battery has become the center of attention. Recently, in developing such batteries, the research and development for the design of a new electrode and a new battery have been conducted in order to improve a capacity density and specific energy.

Among secondary batteries currently being applied, a lithium secondary battery has advantages over conventional batteries such as N-MH, Ni—Cd, and sulfuric acid-lead batteries which use an aqueous electrolyte in that the operating voltage thereof is higher and the energy density thereof is much greater.

In general, in a lithium secondary battery, materials capable of intercalating and deintercalating, or alloying and dealloying lithium ions are used as a negative electrode and a positive electrode, and an organic electrolyte or a polymer electrolyte is filled between the negative electrode and the positive electrode to manufacture the lithium secondary battery. When lithium ions are intercalated and deintercalated from the positive electrode and the negative electrode, electrical energy is generated by an oxidation reaction and a reduction reaction.

Currently, a carbon-based material is mainly used as an electrode active material constituting a negative electrode of a lithium secondary battery. In the case of graphite, the theoretical capacity is about 372 mAh/g, and the actual capacity of the currently commercialized graphite is realized to an extent of about 350 to 360 mAh/g. However, the capacity of a carbon-based material such as graphite is not compatible with a lithium secondary battery requiring a high-capacity negative electrode active material.

In order to meet such a demand, there is an example in which a silicon-based material is used as a negative electrode active material, the silicon-based material which exhibits a higher charge/discharge capacity than a carbon-based material, and which is a metal that is capable of being electrochemically alloyed with lithium. However, such a silicon-based material has a high capacity, but has a very high electrode expansion rate compared with that of a carbon-based material, and has very low charge/discharge efficiency, so that there is a problem in that it is difficult to use a silicon-based material in a large proportion in a negative electrode. In addition, due to the charge/discharge characteristic thereof, charging at a low voltage lasts for a very long time so that the entire charge/discharge time of a secondary battery is significantly delayed.

RELATED ART DOCUMENT

Korea Patent Publication No. 2014-0117947

DISCLOSURE OF THE INVENTION

Technical Problem

The present invention relates to a negative electrode for a secondary battery, and more particularly, to a negative electrode for a secondary battery for suppressing the volume expansion of a negative active material due to the intercalation and deintercalation of lithium, and a method for producing the same.

Technical Solution

A negative electrode for a secondary battery according to an embodiment of the present invention comprises a carbon-based active material; a conductive material; a silicon-based active material-polymer binder combination including a silicon-based active material, and a polymer binder bonded to a surface of the silicon-based active material, wherein the polymer binder suppresses expansion of the silicon-based active material; and a water-based binder.

The silicon-based active material may be included in an amount of 5 to 25 wt % based on a total weight of active material including the carbon-based active material and the silicon-based active material.

The polymer binder may be included in an amount of 25 to 45 wt % based on a weight of the silicon-based active material.

The polymer binder may comprise a hydrophilic polymer material having a hydroxy group (—OH).

The polymer binder may comprise at least one of polyacrylic acid (PAA), polyvinyl alcohol (PVA), or sodium-polyacrylate (Na-PA).

The water-based binder may be included in an amount of 30 to 40 wt % based on a weight of the polymer binder.

The water-based binder may comprise a rubber-based material.

The water-based binder may comprise at least one of styrene butadiene rubber (SBR), acrylonitrile butadiene rubber, acrylic rubber, butyl rubber, or fluoro rubber.

The secondary battery may have a discharge capacity retention rate of 90% or greater up to a fifth cycle under conditions of charging at 0.5 C and discharging at 0.5 C.

Advantageous Effects

According to the negative electrode for a secondary battery according to an embodiment of the present invention, by using a silicon-based active material-polymer binder combination in which a polymer binder for suppressing the expansion of a silicon-based active material is adsorbed to the silicon-based active material, it is possible to effectively suppress the volume expansion of the silicon-based active material.

Also, in the case in which a negative electrode active material including both a carbon-based active material and a silicon-based active material is used, a pre-dispersion slurry is prepared by pre-dispersing the silicon-based active material in a polymer binder such that the polymer binder may be selectively adsorbed on the surface of the silicon-based active material with strong adhesion strength.

In addition, a polymer binder having rigidity may be softened with a water-based binder having high wettability to an electrolyte so that it is possible to prevent cracking or breakage of an electrode. Also, adhesion strength to a current collector may be improved, thereby improving durability, and the lifespan characteristic of an electrochemical device manufactured by using the same may be remarkably improved.

BRIEF DESCRIPTION OF THE DRAWINGS

FIG. 1 is a diagram showing the change in charge/discharge efficiency according to the content of a polymer binder.

FIG. 2 is a diagram showing the change in charge/discharge efficiency according to the content of a conductive material.

FIG. 3 is a diagram showing the change in viscosity according to the solid content of a pre-dispersion slurry.

FIG. 4 is a diagram showing the change in sedimentation height according to the solid content of a pre-dispersion slurry.

FIG. 5 is a diagram showing the result of comparative analysis of the adhesion strength of a secondary battery using a negative electrode according to an embodiment of the present invention.

FIG. 6 is a diagram showing the discharge rate of a secondary battery using a negative electrode according to an embodiment of the present invention.

FIG. 7 is a diagram showing the charge/discharge result of a secondary battery using a negative electrode according to an embodiment of the present invention.

FIG. 8 is a diagram showing the change in electrode thickness of a secondary battery using a negative electrode according to an embodiment of the present invention.

MODE FOR CARRYING OUT THE INVENTION

A negative electrode for a secondary battery according to the present invention provide a technical feature capable of suppressing the volume expansion of a negative electrode active material due to the intercalation and deintercalation of lithium.

Hereinafter, embodiments of the present invention will be described in detail with reference to the accompanying drawings. However, the present invention should not be construed as limited to the embodiments set forth herein, but may be embodied in various forms different from each other. Rather, these embodiments are provided so that the disclosure of the present invention will be thorough and complete, and will fully convey the scope of the present invention to those skilled in the art. Like reference numerals refer to like elements throughout.

A negative electrode for a secondary battery according to an embodiment of the present invention includes a carbon-based active material; a conductive material; a silicon-based active material-polymer binder combination including a silicon-based active material, and a polymer binder for suppressing the expansion of the silicon-based active material bonded to a particle surface of the silicon-based active material; a thickener; and a water-based binder.

A conventional negative electrode for a secondary battery increases the loading of a negative electrode active material formed on a current collector, increases the number of stacks of an electrode in a manufacturing process, or increases the number of winding of an electrode to achieve a high capacity. However, such a method has a limitation in application due to the structure of an electrode.

In order to solve this problem, there is provided a method in which a certain amount of a negative electrode active material is substituted with a silicon-based material which is a high-capacity material. However, in the case in which a silicon-based active material is included to be substituted with a certain amount of a negative electrode active material, cracks are generated and pulverized due to a large volume change accompanied by charging and discharging of lithium, and a secondary battery using such a negative electrode active material still has problems in that the capacity thereof is rapidly reduced as charge/discharge cycles progresses, and the cycle lifespan is shortened.

According to an embodiment of the present invention, w % ben substituting a certain amount of a negative electrode active material with a silicon-based material which is a high-capacity material, a silicon-based active material-polymer binder combination in which a silicon-based active material, and a polymer binder for suppressing the expansion of the silicon-based active material are bonded is used. Such a silicon-based active material-polymer binder combination may be formed from a pre-dispersion aqueous solution prepared by pre-dispersing a hydrophilic polymer which is adsorbed on a particle surface of the silicon-based active material but has very low wettability to an electrolyte with a conductive material and the silicon-based active material.

In addition, according to an embodiment of the present invention, since the polymer binder adsorbed on a particle surface of the silicon-based active material has rigidity, in order to prevent the cracking or breakage of an electrode and to improve adhesion strength to a current collector, the polymer binder is softened with a water-based binder having high wettability to an electrolyte. Such a method for producing a negative electrode from a pre-dispersion aqueous solution will be described later with reference to a method for producing a negative electrode for a secondary battery according to an embodiment of the present invention.

The carbon-based active material is not particularly limited as long as it is capable of intercalating and deintercalating lithium. For example, the carbon-based active material may be one material or a mixture of two or more materials selected from the group consisting of graphite, graphitizable carbon (also referred to as soft carbon), non-graphitizable carbon (also referred to as hard carbon), carbon black, grapheme, and a graphene oxide.

The silicon-based active material is used to substitute a certain amount of carbon-based active material, and may be one material or a mixture of two or more materials selected from the group consisting of Si, SiOx, and an Si alloy. The silicon-based active material is substituted with a certain amount of carbon-based active material in a range that increases the capacity of a negative electrode, and at the same time, prevents the excessive expansion thereof, and may be included in an amount of 5 to 25 wt % based on the total weight of active material including the carbon-based active material and the silicon-based active material.

The polymer binder is adsorbed on at least a portion of the surface of the silicon-based active material to be used in order to suppress the expansion of the silicon-based active material. The polymer binder is adsorbed on a particle surface of the silicon-based active material, but may include a hydrophilic polymer having very low wettability to an electrolyte, and the hydrophilic polymer has a plurality of hydroxyl groups (—OH) capable of hydrogen bonding which is a strong bonding to be dispersed in water. As a result, the polymer binder has rigidity, has a high possibility of being adsorbed on the surface of the silicon-based active material due to strong bonding force, and has a characteristic of not being wet in an electrolyte which is an organic solution due to strong hydrophilicity.

As described above, the polymer binder includes a polymer material having strong hydrophilicity. For example, the polymer binder may include one material or a mixture of two or more materials selected from the group consisting of a polyethylene oxide, a polypropylene oxide, polyacrylic acid, polyvinyl alcohol, polyvinyl acetate, and sodium-polyacrylate. Preferably, the polymer binder may include at least one of polyacrylic acid (PAA), polyvinyl alcohol (PVA), or sodium-polyacrylate (Na-PA), all of which have excellent adsorption force to a silicon-based active material.

The polymer binder may be included in a range that prevents the disconnection of a conductive network and maximizes the charge/discharge efficiency of a secondary battery, and when used in an amount of 25 wt % or greater based on the total weight of the silicon-based active material, the charge/discharge efficiency of a secondary battery may be rapidly increased and maintained. However, if the content of the polymer binder is excessively increased, the viscosity of a pre-dispersion slurry increases so that the dispersibility is deteriorated and the workability is reduced in a manufacturing process of a negative electrode. Therefore, the content may be controlled to be 45 wt % or less based on the total weight of the silicon-based active material.

FIG. 1 is a diagram showing the change in charge/discharge efficiency according to the content of a polymer binder.

In FIG. 1, the silicon-based active material described above was used, and after fixing the weight percentage of the conductive material at 1 wt % based on the total weight of the pre-dispersion slurry, the charge/discharge efficiency according to charging and discharging was confirmed while increasing the content of the polymer binder. Here, the charge/discharge efficiency is a result confirmed in the first cycle and the second cycle. The reason for confirming the initial charge/discharge efficiency is that due to the characteristics of the silicon-based material which a high-capacity material, the disconnection of the conductive network caused by the volume expansion during the initial charging has the greatest influence on the reduction of the charge/discharge efficiency, and the use of the polymer binder may suppress this.

As shown in FIG. 1, in the case in which the ratio of the weight percentage of the polymer binder to the weight percentage of the silicon-based active material is 25.3% or greater, it can be seen that the charge/discharge efficiency is increased, and especially in the second cycle, it can be seen that the charge/discharge efficiency is rapidly increased. In the case in which the content of the polymer binder is further increased, it can be seen that the charge/discharge efficiency is maintained at a similar level. Therefore, in using the silicon-based active material, when the content of the polymer binder is 25 wt % or greater based on the total weight of the silicon-based active material, it is possible to improve the charge/discharge efficiency.

The conductive material is not particularly limited as long as it has conductivity without causing a side reaction with other elements of a secondary battery. For example, the conductive material may include one material or a mixture of two or more materials selected from the group consisting of graphite such as natural graphite, artificial graphite, and the like; carbon black such as carbon black (super-p), acetylene black, ketjen black, channel black, furnace black, lamp black, summer black, and the like; a conductive fiber such as a carbon fiber, a carbon nanofiber, a metal fiber, and the like; metal powder such as carbon fluoride, aluminum, nickel powder, and the like; a conductive whisker such as a zinc oxide, potassium titanate, and the like; a conductive metal oxide such as a titanium oxide, and the like; and a conductive material such as a polyphenylene derivative, and the like.

The conductive material may be included in a range such that a negative electrode for a secondary battery maintains conductivity. When used in an amount of 5 wt % or greater based on the total weight of the silicon-based active material, the charge/discharge efficiency is rapidly increased, and when used in an amount of 10 wt % or greater, it is possible to obtain a charge/discharge efficiency of 95% or more. As the content of the conductive material is increased, it is possible to form an effective conductive network. However, in order to control the solid concentration of the generated negative electrode slurry, the content may be controlled to be 20 wt % or less based on the total weight of the silicon-based active material.

FIG. 2 is a diagram showing the change in charge/discharge efficiency according to the content of a conductive material.

In FIG. 2, the silicon-based active material described above was used, and after fixing the ratio of the weight percentage of the silicon-based active material to the weight percentage of the polymer binder at 25%, the charge/discharge efficiency according to charging and discharging was confirmed while increasing the content of the polymer binder. Here, the charge/discharge efficiency is a result confirmed in the first cycle and the second cycle as in FIG. 1.

As show in in FIG. 2, in the case in which the ratio of the weight percentage of the conductive material to the weight percentage of the silicon-based active material is 5.3% or greater, it can be seen that the charge/discharge efficiency is rapidly increased. As the content of the conductive material was increased, the charge/discharge efficiency was continuously increased. Accordingly, the conductive material may be included in an amount of 5 wt % or greater based on the weight of the silicon-based active material.

In addition, when the charge/discharge efficiency of 95% or greater is determined to be the maximum efficiency of the silicon-based active material, the required content of the conductive material is 10 wt % or greater based on the weight of the silicon-based active material, and in the case of 15 wt % or greater, much better performance improvement may be achieved.

The thickener may be selectively included to determine the solid content of a negative electrode slurry for manufacturing a negative electrode. That is, the thickener is added when needed in order to control the solid content of the negative electrode slurry to be in an appropriate range, and may be one material or a mixture of two or more materials selected from cellulose-based materials such as carboxy methyl cellulose (CMC), methyl cellulose, hydroxypropyl cellulose, and the like. The content of the thickener is determined according to the solid content of the negative electrode slurry, and may be included in an amount of 0 to 5 wt % based on the total weight of the solid content in the negative electrode slurry so that the negative electrode slurry has a solid content of 40 to 50 wt % based on the total weight.

The water-based binder is added to assist the flexibility of an electrode that is the negative electrode, and the adhesion strength of the electrode. The water-based binder may include a rubber-based material, and may be one material or a mixture of two or more materials selected from the group consisting of styrene butadiene rubber (SBR), acrylonitrile butadiene rubber, acrylic rubber, butyl rubber, and fluoro rubber.

The polymer binder is characterized by having a plurality of hydroxy groups (—OH) capable of hydrogen bonding which is generally strong bonding, in order to be dispersed in water. As a result, the polymer binder has very stiff rigidity, has a high possibility of being adsorbed on a particle surface of the silicon-based active material with strong adhesion strength, and has very strong hydrophilicity, thereby having a characteristic of not being wet in an electrolyte which is an organic solution.

Here, the polymer binder has strong adhesion strength, and therefore, the rigidity of the polymer binder itself is very high so that a phenomenon of cracking or breakage of the electrode may occur. Thus, it is necessary to add the water-based binder.

The water-based binder may be included in an amount of 30 to 40 wt % based on the weight of the polymer binder. When included in an amount of 30 wt % or less, problems such as lack of adhesion strength and cracking of the electrode may occur. When included in an amount of 40 wt % or greater, the water-based binder having good wettability to an electrolyte may become wet in the electrolyte, thereby reducing the rigidity of the polymer binder excessively so that the effect of suppressing the volume expansion of the silicon-based active material is deteriorated.

As described above, the silicon-based active material-polymer binder combination is formed from a pre-dispersion slurry prepared by pre-dispersing a hydrophilic polymer adsorbed to a particle surface of the silicon-based active material but having very low wettability to an electrolyte with the conductive material and the silicon-based active material. That is, in order to use the silicon-based active material having high charge/discharge capacity, it is very important to suppress the volume expansion of the silicon-based active material due to charging and discharging, and the volume expansion of the silicon-based active material is suppressed by the polymer binder adsorbed to the silicon-based active material.

The pre-dispersion slurry is then mixed with the carbon-based active material, and the water-based binder is added thereto to prepare the negative electrode slurry. In preparing a negative electrode using a negative electrode active material including the carbon-based active material and the silicon-based active material, by preparing a pre-dispersion slurry by pre-dispersing only the silicon-based active material with the conductive material and the polymer binder, it is possible to effectively suppress the volume expansion of the silicon-based active material.

That is, in the case of preparing the negative electrode slurry by dispersing the conductive material and the polymer binder with the negative electrode active material including the carbon-based active material and the silicon-based active material, when mixing the polymer binder, the object on which the polymer binder is adsorbed is not limited to the silicon-based active material, but is extended to the carbon-based active material. Accordingly, the degree to which the polymer binder is adsorbed to the silicon-based active material is reduced so that the volume expansion of the silicon-based active material may not be sufficiently suppressed.

On the other hand, when the pre-dispersion slurry is prepared by pre-dispersing the silicon-based active material with the conductive material and the polymer binder, it is possible that the polymer binder is selectively adsorbed on the surface of the silicon-based active material. That is, the surface of the silicon-based active material generally has hydrophilicity, and the polymer binder to be mixed includes a hydrophilic polymer material. Therefore, it is possible to form the silicon-based active material-polymer binder combination by effectively attaching the polymer binder to the surface of the silicon-based active material with strong hydrogen bonding force along with van der Walls force.

Hereinafter, a method for producing a negative electrode for a secondary battery according to an embodiment of the present invention will be described in detail.

The method for producing a negative electrode for a secondary battery according to an embodiment of the present invention includes preparing a carbon-based active material S100; preparing a pre-dispersion slurry by mixing a silicon-based active material, a conductive material, and a polymer binder in a dispersion medium S200; mixing the carbon-based active material with the pre-dispersion slurry S300; preparing a negative electrode slurry by mixing a water-based binder with the mixture in which the carbon-based active material is mixed S500; applying the prepared negative electrode slurry on a current collector S600; and forming a negative electrode by removing moisture from the negative electrode slurry S700.

Here, the preparing a carbon-based active material S100 and the preparing a pre-dispersion slurry by mixing a silicon-based active material, a conductive material, and a polymer binder in a dispersion medium S200 are not in a time-series sequencing relation to each other. The preparing a pre-dispersion slurry S200 may be performed after the preparing a carbon-based active material S100 is performed, or the preparing a carbon-based active material S100 may be performed after the preparing a pre-dispersion slurry S200 is performed. The preparing a carbon-based active material S100 and the preparing a pre-dispersion slurry S200 may be performed simultaneously.

In the preparing a carbon-based active material S100, a carbon-based active material in a power state is first prepared. Here, as the carbon-based active material, various carbon-based materials capable of intercalating and deintercalating lithium may be used as described above.

In the preparing a per-dispersion slurry S200, a pre-dispersion mixture is first formed by mixing a silicon-based active material in a powder state, a conductive material, and a polymer binder. Then, a dispersion medium, for example, water, is added to the mixture and stirred to prepare a pre-dispersion slurry. The adding of water to the mixture and stirring may be carried out by a saw blade type mixer having a rotation speed exceeding 2000 to 2500 rpm such as a homogenizer, a universal stirrer, a clear mixer, and a fill mixer which are known in the art, or by equipment such as a bead mill, a ball mill, a basket mill, an attrition mill, and the like, of which a filling material such as beads are filled thereto to perform mixing.

In the case of forming a per-dispersion mixture by mixing a silicon-based active material, a conductive material, and a polymer binder, the per-dispersion slurry is formed by dispersing the silicon-based active material-polymer binder combination in which the silicon-based active material and the polymer binder is bonded and the conductive material in water which is a dispersion medium.

Here, the solid content of the pre-dispersion slurry is controlled by the viscosity of the pre-dispersion slurry.

In detail, the viscosity of the pre-dispersion slurry prepared by the same mixing process is determined by the ratio of the polymer binder to the silicon-based active material. That is, as the content of the polymer binder is increased, the viscosity of the pre-dispersion slurry is increased, and in the case of the silicon-based active material, the solid density thereof is from 2.1 to 2.35 g/cm$^3$. Accordingly, in order to suppress the sedimentation of the silicon-based active material after the per-dispersion slurry is prepared, a viscosity of a certain range is required.

Here, the range of the viscosity is limited in order to improve the workability while suppressing the sedimentation of the silicon-based active material to the maximum. The pre-dispersion slurry may have a viscosity of 3000 to 10000 cp. That is, in the case in which the viscosity of the pre-dispersion slurry is less than 3000 cp, the sediment rate of the silicon-based active material is increased, so that particles of the silicon-based active material sink rapidly during the rest period of the pre-dispersion slurry, resulting in the deterioration of the physical properties of the pre-dispersion slurry. In the case in which the viscosity of the pre-dispersion slurry is greater than 10000 cp, the dispersibility of the pre-dispersion slurry is reduced and the workability in performing the process becomes very low.

FIG. 3 is a diagram showing the change in viscosity according to the solid content of a pre-dispersion slurry. FIG. 4 is a diagram showing the change in sedimentation height according to the solid content of a pre-dispersion slurry. In FIGS. 3 and 4, the case of which the ratio of the polymer binder to the silicon-based active material is 1:0.24 will be described as an example.

As shown in FIG. 3, in the case in which the ratio of the polymer binder to the silicon-based active material is 1:0.24, when the solid content has a value of 22 to 25 wt % based on the total weight of the pre-dispersion slurry, the pre-dispersion slurry has a viscosity of 3000 to 10000 cp. Therefore, in the case in which the ratio of the polymer binder to the silicon-based active material is 1:0.24, the suitable solid content of the pre-dispersion slurry is determined to be a value of 22 to 25 wt %.

In FIG. 4, after the pre-dispersion slurry is prepared with the ratio of the polymer binder to the silicon-based active material of 1:0.24, a certain amount thereof is collected in a vial capable of measuring length, and the height of the bottom surface of the pre-dispersion slurry is measured. Thereafter, post-processing is performed for 24 hours at room temperature, and then a bar having a certain length is inserted into the vial to measure the height of the bottom surface of the pre-dispersion slurry again.

In the case of the pre-dispersion slurry, the sedimentation rate is determined according to a certain viscosity ratio, and the sedimented silicon-based active material and the polymer binder are accumulated on the bottom surface. From the height measured by the inserted bar after 24 hours, it is possible to measure the height of the sedimentation layer finally sedimented on the bottom of the vial, and to confirm proportionally how much has been sedimented during a certain period of time. Here, the reason for measuring the height of the sedimented layer after 24 hours is that when mass producing negative electrodes for a secondary battery, a rest period is given according to a process, and the rest period is usually 12 to 24 hours. Therefore, the height of the sedimentation layer was measured after 24 hours.

As shown in FIG. 4, in the case in which the ratio of the polymer binder to the silicon-based active material is 1:0.24, when the solid content of the pre-dispersion slurry has a value of 22 to 25 wt % based on the total weight of the pre-dispersion slurry, it can be seen that the ratio of the sedimentation layer is within 3%. From this, it can be seen that in the case in which the solid content of the pre-dispersion slurry is 22 wt % or greater, the pre-dispersion slurry has a viscosity of 3000 to 10000 cp, so that it is possible to effectively achieve the sedimentation of the silicon-based active material and the polymer binder.

Therefore, in the preparing a pre-dispersion slurry S200, the solid content of the pre-dispersion slurry may be controlled such that the pre-dispersion slurry may have a viscosity of 3000 to 10000 cp. As described above, since the polymer binder may be included in an amount of 25 to 45 wt % based on the weight of the silicon-based active material, in order to have the viscosity of the pre-dispersion slurry within a range satisfying the above range, the pre-dispersion slurry may have a solid content of 15 to 25 wt % based on the total weight.

In the mixing the carbon-based active material S300, when the pre-dispersion slurry is prepared by the process described above, a negative electrode slurry is prepared by mixing the pre-dispersion slurry with the carbon-based active material. By preparing the pre-dispersion slurry as described above, and mixing the carbon-based active material with the pre-dispersion slurry, the polymer binder may be selectively adsorbed on the surface of the silicon-based active material. That is, the surface of the silicon-based active material generally has hydrophilicity, and the polymer binder to be mixed includes a hydrophilic polymer material, thereby being effectively attached to the surface of the silicon-based active material with strong hydrogen bonding force along with van der Walls force, so that it is possible to form a silicon-based active material-polymer binder combination.

Thereafter, the method for producing a negative electrode for a secondary battery may further include mixing a thickener with the mixture in which the carbon-based active material is mixed S400. The thickener is selectively included in the mixture to determine the solid content of a negative electrode slurry for manufacturing a negative electrode, and the content thereof is controlled to be in an appropriate range in order to control the solid content of the negative electrode slurry to be prepared afterwards. In the case in which the negative electrode slurry has a solid content of 15 to 25 wt % based on the total weight, it is possible to improve the workability while applying, and at the same time, to improve the rate of drying for removing water from the negative electrode slurry. Therefore, the thickener may be included in an amount of 0 to 5 wt % based on the total weight of the solid content in the negative electrode slurry such that the negative electrode slurry has the solid content described above.

In the preparing a negative electrode slurry S500, in the case in which the mixture in which the carbon-based active material is mixed, or the thickener is included in the pre-dispersion slurry, the negative electrode slurry is prepared by mixing a water-based binder with the mixture in which the carbon-based active material and the thickener are mixed with the pre-dispersion slurry.

As described above, the polymer binder has very stiff rigidity, has a high possibility of being adsorbed on a particle surface of the silicon-based active material with strong adhesion strength, and has very strong hydrophilicity, thereby having a characteristic of not being wet in an electrolyte which is an organic solution. By the addition of the water-based binder, the polymer binder having rigidity is softened with the water-based binder having high wettability to an electrolyte so that it is possible to prevent cracking or breakage of the electrode, and to improve the adhesion strength to the current collector.

Here, the negative electrode slurry may have a solid content of 40 to 50 wt % based on the total weight. That is, the pre-dispersion slurry has a solid content of 15 to 25 wt % based on the total weight of the pre-dispersion slurry, and by mixing the carbon-based active material and the water-based binder, or by further mixing the thickener therewith when needed, the negative electrode slurry may have a solid content of 40 to 50 wt % based on the total weight of the negative electrode slurry. By maintaining the solid content of the negative electrode slurry to be in the range above described, it is possible to improve the workability while applying, and at the same time, to improve the rate of drying for removing water from the negative electrode slurry.

In the applying the negative electrode slurry on a current collector S600, the negative electrode slurry prepared in the preparing a negative electrode S500 is applied on the current collector. Here, in general, a current collector having a thickness of 3 μm to 500 μm may be used, and is not particularly limited as long as it has high conductivity without causing chemical change in a secondary battery. For example, copper, stainless steel, aluminum, nickel, titanium, sintered carbon, or aluminum, or stainless steel, the surface of which are treated with carbon, nickel, titanium, or silver, and the like may be used.

The forming a negative electrode S700 is performed by removing water from the negative electrode slurry. The water included in the negative electrode slurry may be removed by drying the negative electrode slurry applied on the current collector, and a common method used for forming a negative electrode may be used.

Hereinafter, the result according to an embodiment of the present invention will be described in comparison with the experimental results of each comparative example and example. Here, the following examples are provided to illustrate the present invention, and the scope of the present invention is not limited by experimental conditions.

Comparative Example 1

As a negative electrode active material, a carbon-based active material and a silicon-based active material were used in an amount of 90 wt % and 10 wt % respectively based on the total weight of the negative electrode active material.

A conductive material of carbon black was dispersed in water which is a dispersion medium, and the negative electrode active material was mixed thereto as a whole. Then, carboxymethyl cellulose (CMC) which is a thickener, and styrene butylene rubber (SBR) which is a binder were sequentially mixed therewith to prepare a negative electrode slurry, and the negative electrode slurry was applied on a current collector and dried to form a negative electrode for a secondary battery.

The negative electrode for a secondary battery was formed of the negative electrode active material of 95.6 wt %, the conductive material of 1.0 wt %, the thickener of 1.1 wt %, and the binder of 2.3 wt %.

Here, the loading of the negative electrode for a secondary battery of Comparative Example 1 was 204 mg/25 cm², and the porosity thereof was 33.9%.

Example 1

As a negative electrode active material, a carbon-based active material and a silicon-based active material were used in an amount of 90 wt % and 10 wt % respectively based on the total weight of the negative electrode active material.

A conductive material of carbon black, a silicon-based active material, and a polymer binder were pre-dispersed in water which is a dispersion medium to prepare a pre-dispersion slurry, and a carbon-based active material was mixed therewith. In addition, carboxymethyl cellulose (CMC) which is a thickener was mixed with a mixture in which the carbon-based active material was mixed, and styrene butylene rubber (SBR) which is a binder was sequentially mixed therewith to prepare a negative electrode slurry. Thereafter, the negative electrode slurry was applied on a current collector and dried to form a negative electrode for a secondary battery. Here, 9.5 wt % of the polymer binder based on the total weight of the polymer binder was first added to prepare a first pre-dispersion slurry, and then the prepared first pre-dispersion slurry and the remaining 90.5 wt % of the polymer binder were further mixed to prepare a second pre-dispersion slurry. The thickener and the water-based binder were sequentially mixed with the second pre-dispersion slurry to prepare the negative electrode slurry.

The negative electrode for a secondary battery was formed of the negative electrode active material of 95.6 wt %, the polymer binder of 2.4 wt %, the conductive material of 1.0 wt %, the thickener of 0.15 wt %, and the water-based binder of 0.85 wt %.

Here, the loading of the negative electrode for a secondary battery of Example 2 was 205 mg/25 cm², and the porosity thereof was 35.4%.

Example 2

As a negative electrode active material, a carbon-based active material and a silicon-based active material were used in an amount of 90 wt % and 10 wt % respectively based on the total weight of the negative electrode active material.

A conductive material of carbon black, a silicon-based active material, and a polymer binder were pre-dispersed in water which is a dispersion medium to prepare a pre-dispersion slurry, and a carbon-based active material was mixed therewith. In addition, carboxymethyl cellulose (CMC) which is a thickener was mixed with a mixture in which the carbon-based active material was mixed, and styrene butylene rubber (SBR) which is a binder was sequentially mixed therewith to prepare a negative electrode slurry. Thereafter, the negative electrode slurry was applied on a current collector and dried to form a negative electrode for a secondary battery. In this case, the polymer binder as a whole was mixed with the silicon-based active material and the conductive material to prepare the pre-dispersion slurry.

The negative electrode for a secondary battery was formed of the negative electrode active material of 95.6 wt %, the polymer binder of 2.4 wt %, the conductive material of 1.0 wt %, the thickener of 0.15 wt %, and the water-based binder of 0.85 wt %.

Here, the loading of the negative electrode for a secondary battery of Example 2 was 205 mg/25 cm$^2$, and the porosity thereof was 35.4%.

FIG. 5 is a diagram showing the result of comparative analysis of the adhesion strength of a secondary battery using a negative electrode according to an embodiment of the present invention.

As shown in FIG. 5, in the case of Comparative Example 1, the adhesion strength to the current collector was higher than that of Example 1 and Example 2. However, the difference is insignificant. Comparative Example 1, Example 1, and Example 2 were all confirmed to have a certain level of adhesion strength.

FIG. 6 is a diagram showing the discharge rate of a secondary battery using a negative electrode according to an embodiment of the present invention.

In FIG. 6, discharge rates of 0.5 C, 1.0 C, 2.0 C, 3.0 C, and 4.0 C were confirmed based on the discharge capacity of 0.1 C. As shown in FIG. 6, in the cases of Example 1 and Example 2, the discharge rate characteristic thereof were very high when compared to that of Comparative Example 1. This is the result of the polymer binder being adsorbed on the surface of the silicon-based active material, and it can be seen that the polymer binder effectively suppresses the volume expansion due to the charge/discharge of the silicon-based active material by using strong adhesion strength thereof.

FIG. 7 is a diagram showing the charge/discharge result of a secondary battery using a negative electrode according to an embodiment of the present invention.

As shown in FIG. 7, when the lifespan evaluation is conducted by performing charging and discharging at 0.5 C/0.5 C for 30 cycles, it can be seen that Comparative Example 1 has a low discharge capacity retention rate because the volume expansion was not at all suppressed. In comparison, when a polymer binder is used, there is a superiority in lifespan characteristic. In particular, both Example 1 and Example 2 have a discharge capacity retention rate of 90% or greater up to the fifth cycle, and therefore, it can be confirmed that the volume expansion of the silicon-based active material is effectively suppressed by the polymer binder.

FIG. 8 is a diagram showing the change in electrode thickness of a secondary battery using a negative electrode according to an embodiment of the present invention.

As shown in FIG. 8, in the case of Comparative Example 1, the full charge thickness change ratio of the electrode was measured to be 43.9%. On the other hand, in the case of Example 1, the full charge thickness change ratio of the electrode was measured to be 48.4%, and in the case of Example 2, the full charge thickness change ratio of the electrode was measured to be 41.4%.

Here, when the full charge thickness change ratio was confirmed after 30 cycle evaluation, Comparative Example 1 showed a thickness expansion rate lower than that of Example 1. However, in the case of Comparative Example 1, since the result of lifespan evaluation described above shows a very low lifespan, it cannot be seen that the performance of the silicon-based active material is exhibited. On the other hand, it can be confirmed that Example 2 shows a thickness expansion rate lower than that of Comparative Example 1.

From the results, it can be seen that the lifespan characteristic of a secondary battery was improved both in Example 1 and Example 2 when compared to Comparative Example 1, and in preparing the pre-dispersion slurry, in the case of Example 1 in which the final pre-dispersion slurry is prepared by the first pre-dispersion slurry and the second pre-dispersion slurry, it is possible to improve the adhesion strength to the current collector. In the case of Example 2 in which the pre-dispersion slurry is prepared by mixing the polymer binder as a whole with the silicon-based active material and the conductive material, it is possible to effectively reduce the thickness expansion rate.

That is, according to the negative electrode for a secondary battery and the method for producing the same according to an embodiment of the present invention, by using a silicon-based active material-polymer binder combination in which a polymer binder for suppressing the expansion of a silicon-based active material is adsorbed to the silicon-based active material, it is possible to effectively suppress the volume expansion of the silicon-based active material.

Also, in the case in which a negative electrode active material including both a carbon-based active material and a silicon-based active material is used, a pre-dispersion slurry is prepared by pre-dispersing the silicon-based active material in a polymer binder such that the polymer binder may be selectively adsorbed on the surface of the silicon-based active material with strong bonding force.

In addition, a polymer binder having rigidity may be softened with a water-based binder having high wettability to an electrolyte so that it is possible to prevent cracking or breakage of an electrode. Also, adhesion strength to a current collector may be improved, thereby improving durability, and the lifespan characteristic of an electrochemical device manufactured by using the same may be remarkably improved.

In the above, while the preferred embodiments of the present invention have been described and illustrated using specific terms, such terms are used only for the purpose of clarifying the invention. It is to be understood that various changes and modifications may be made to the embodiments of the present invention and the described terms without departing from the spirit and scope of the following claims. Such modified embodiments should not be individually understood from the spirit and scope of the present invention, but should be regarded as being within the scope of the claims of the present invention.

What is claimed is:

1. A negative electrode for a secondary battery comprising:
   a carbon-based active material;
   a conductive material;
   a silicon-based active material-polymer binder combination comprising a silicon-based active material, and a polymer binder bonded to a surface of the silicon-based active material, wherein the polymer binder suppresses expansion of the silicon-based active material; and
   a water-based binder,
   wherein the polymer binder is included in an amount of 33 to 45 wt % based on a weight of the silicon-based active material, and
   a ratio of a weight percentage of the polymer binder to a weight percentage of the silicon-based active material is 25.3% or greater and 43.5% or less.

2. The negative electrode for a secondary battery of claim 1, wherein the silicon-based active material is included in an amount of 5 to 25 wt % based on a total weight of active material including the carbon-based active material and the silicon-based active material.

3. The negative electrode for a secondary battery of claim 1, wherein the polymer binder comprises a hydrophilic polymer material having a hydroxy group (—OH).

4. The negative electrode for a secondary battery of claim 1, wherein the polymer binder comprises at least one of polyacrylic acid (PAA), polyvinyl alcohol (PVA), or sodium-polyacrylate (Na-PA).

5. The negative electrode for a secondary battery of claim 4, wherein the water-based binder comprises a rubber-based material.

6. The negative electrode for a secondary battery of claim 1, wherein the water-based binder is included in an amount of 30 to 40 wt % based on a weight of the polymer binder.

7. The negative electrode for a secondary battery of claim 1, wherein the water-based binder comprises a rubber-based material.

8. The negative electrode for a secondary battery of claim 1, wherein the water-based binder comprises at least one of styrene butadiene rubber (SBR), acrylonitrile butadiene rubber, acrylic rubber, butyl rubber, or fluoro rubber.

9. A secondary battery comprising the negative electrode of claim 1, said secondary battery having a discharge capacity retention rate of 90% or greater up to a fifth cycle under conditions of charging at 0.5 C and discharging at 0.5 C.

10. The negative electrode for a secondary battery of claim 1, wherein the polymer binder is adsorbed to the surface of the silicon-based active material.

11. The negative electrode for a secondary battery of claim 1, wherein the polymer binder is a hydrophilic polymer binder having a plurality of hydroxy groups selectively adsorbed to the surface of the silicon-based active material.

12. The negative electrode for a secondary battery of claim 1, wherein the polymer binder is a hydrophilic polymer binder having a plurality of hydroxy groups, and wherein the silicon-based active material-polymer binder combination is formed by preparing a pre-dispersion slurry in which the hydrophilic polymer binder having the plurality of hydroxy groups is selectively adsorbed to a hydrophilic particle surface of the silicon-based active material.

13. The negative electrode for a secondary battery of claim 1, wherein a ratio of a weight percentage of the conductive material to a weight percentage of the silicon-based active material is 5.3% or greater.

14. The negative electrode for a secondary battery of claim 1, wherein the silicon-based active material is included in an amount of 5 to 25 wt % based on a total weight of active material including the carbon-based active material and the silicon-based active material, and the water-based binder is included in an amount of 30 to 40 wt % based on a weight of the polymer binder.

15. The negative electrode for a secondary battery of claim 1, wherein the ratio of the weight percentage of the polymer binder to the weight percentage of the silicon-based active material is 25.3% or greater and 33.8% or less.

* * * * *